US00RE44861E

(19) United States
(12) Reissued Patent
Park et al.

(10) Patent Number: US RE44,861 E
(45) Date of Reissued Patent: Apr. 22, 2014

(54) METHOD AND SYSTEM FOR REQUESTING AND GRANTING POC USER MEDIA TRANSMISSION RIGHT

(71) Applicant: Samsung Electronics Co., Ltd., Gyeonggi-do (KR)

(72) Inventors: Sung-Jin Park, Gyeonggi-do (KR); Sang-Kyung Sung, Seoul (KR); Ji-Hye Lee, Seoul (KR); Wuk Kim, Gyeonggi-do (KR)

(73) Assignee: Samsung Electronics Co., Ltd (KR)

(21) Appl. No.: 13/846,386

(22) Filed: Mar. 18, 2013

Related U.S. Patent Documents

Reissue of:
(64) Patent No.: 7,925,287
Issued: Apr. 12, 2011
Appl. No.: 11/862,927
Filed: Sep. 27, 2007

(30) Foreign Application Priority Data

Sep. 27, 2006 (KR) ..... 10-2006-0094204

(51) Int. Cl.

| | |
|---|---|
| ***H04B 7/00*** | (2006.01) |
| ***H04M 3/42*** | (2006.01) |
| ***G01R 31/08*** | (2006.01) |
| ***G06F 11/00*** | (2006.01) |
| ***G08C 15/00*** | (2006.01) |
| ***H04J 1/16*** | (2006.01) |
| ***H04J 3/14*** | (2006.01) |
| ***H04L 1/00*** | (2006.01) |
| ***H04L 12/26*** | (2006.01) |

(52) U.S. Cl.
USPC ..... 455/515; 455/516; 455/414.1; 455/518; 455/519; 370/235

(58) Field of Classification Search
USPC ..... 455/509–520
See application file for complete search history.

(56) References Cited

U.S. PATENT DOCUMENTS 7,561,528 B2 * 7/2009 Huh et al. ..... 370/252
2005/0266837 A1 * 12/2005 Lim ..... 455/418

(Continued)

OTHER PUBLICATIONS

OMA (Open Mobile Alliance) PoC User Plane Technical Specification V1.0, Jun. 9, 2006 (http://www.openmobilealliance.org/technical/release_program/docs/CopyrightClick.aspx?pck=PoC&file=V1_0-20060609-A/OMA-TS-PoC-UserPlane-V1_0-20060609-A.pdf).*

(Continued)

*Primary Examiner* — Dwayne Bost
*Assistant Examiner* — Larry Sternbane
(74) *Attorney, Agent, or Firm* — The Farrell Law Firm, P.C.

(57) ABSTRACT

Provided is a method and system for requesting and granting a media transmission right of a PoC user. The method includes a PoC client transmitting an MBCP Request message to a PoC server, the PoC server receiving the MBCP Request message, determining whether a current state corresponds to a media transmission denial condition, and if it is determined that the current state corresponds to a media transmission denial condition, transmitting an MBCP Deny message containing at least one of time information of a media transmission timer and time information of a retry-after timer to the PoC client, and the PoC client receiving the MBCP Deny message, activating the media transmission timer and the retry-after timer using the respective time information, and re-transmitting the MBCP Request message to the PoC server if one of the media transmission timer and the retry-after timer, the retry-after timer having a longer time value, expires.

14 Claims, 8 Drawing Sheets

(56) References Cited

U.S. PATENT DOCUMENTS

| | | | | |
|---|---|---|---|---|
| 2006/0030344 | A1* | 2/2006 | Lim | 455/512 |
| 2006/0034336 | A1* | 2/2006 | Huh et al. | 370/498 |
| 2006/0087973 | A1 | 4/2006 | Huang | |
| 2006/0116151 | A1 | 6/2006 | Sullivan et al. | |
| 2006/0142036 | A1* | 6/2006 | Lim | 455/518 |
| 2006/0281432 | A1* | 12/2006 | Isaac et al. | 455/323 |
| 2007/0249381 | A1* | 10/2007 | Forslow | 455/517 |
| 2010/0017524 | A1* | 1/2010 | Huh | 709/228 |

OTHER PUBLICATIONS

Kim et al., "IMS-Based Push-To-Talk Over GPRS/UMTS", IEEE Communications Society / WCNC 2005, 2005.

* cited by examiner

METHOD AND SYSTEM FOR REQUESTING AND GRANTING POC USER MEDIA TRANSMISSION RIGHT

Matter enclosed in heavy brackets [ ] appears in the original patent but forms no part of this reissue specification; matter printed in italics indicates the additions made by reissue.

PRIORITY

This application claims priority under 35 U.S.C. §119(a) to a Patent Application filed in the Korean Intellectual Property Office on Sep. 27, 2006 and assigned Serial No. 2006-94204, the contents of which are incorporated herein by reference.

BACKGROUND OF THE INVENTION

1. Field of the Invention

The present invention relates generally to a method and system for requesting and granting Push-To-Talk (PTT) over Cellular (PoC) user media transmission right. In particular, the present invention relates to a method and system optimized for a PoC user to request and receive media transmission right in a PoC network in which queuing is not supported.

2. Description of the Related Art

The significant development of mobile communication and the spread of communication networks have contributed to various extra services and applications using a cellular phone. At the same time, demand among cellular phone users for various extra services, such as a positioning service, a multimedia service, and a Push-To-Talk (PTT) service, is increasing. Among these extra services, the PTT service supports various supplementary functions such as an instant messenger function and a status display function, as well as supporting a group call and a voice call, which are also provided by an existing radio or a Trunked Radio System (TRS).

Currently, standardization of a PTT-over-Cellular (PoC) service, which employs the PTT function in a mobile communication network, is actively being developed. One unique feature of the PoC service, which is distinguished from existing mobile communication services, is that a user can participate in a plurality of PoC sessions and can move among the PoC sessions to use a call service. A requirement that the user can move among the plurality of PoC sessions to use the call service is specified in the Open Mobile Alliance (OMA), which is a forum for specifying mobile communications services.

FIG. 1 is a schematic diagram of a conventional PoC service system. Referring to FIG. 1, a PoC client 102, which is a service requester installed in a PoC user terminal 100, is connected to a Session Initiation Protocol/Internet Protocol (SIP/IP) core network 120, which supports SIP and IP multimedia functions, via an access network 110.

The PoC client 102 resides in the PoC user terminal 100 to provide access to the PoC service. The PoC client 102 mainly serves a PoC user to initiate a PoC session, participates in a PoC session that is currently proceeding, and terminates a PoC session. In addition, the PoC client 102 acts to make and transfer a talk burst, support an instant personal alert, and perform authentication when accessing the PoC service. Hereinafter, unless otherwise stated, the PoC client 102 is assumed to be the same as a PTT service subscriber.

The SIP/IP core network 120 is connected to a PoC server 150, a PoC Extensible Markup Language Document Management Server (XDMS) 140, and a PoC box 180 in order to support the PoC service.

The PoC server 150 has a controlling PoC function for maintaining and managing a PoC session, or a participating PoC function for participating in a PoC session established for a one-to-one PoC call or a one-to-many PoC call.

A function of the PoC server 150 is classified into a Controlling PoC Function (CF) for generally maintaining and managing a PoC session and a Participating PoC Function (PF) for maintaining and managing each PoC session, which will be described in more detail with reference to Tables 1 and 2.

TABLE 1

| Controlling PoC Function (CF) provides centralized PoC session handling |
|---|
| Provides the centralized Media distribution |
| Provides the centralized Talk Burst Arbitration functionality including talker identification |
| Provides SIP session handling, such as SIP session origination, termination, etc. |
| Provides policy enforcement for participation in group sessions |
| Provides the participants information |
| Collects and provides centralized media quality information |
| Provides centralized changing report |
| May provide transcoding between different codecs |
| Supports Talk Burst Control Protocol Negotiation |

As shown in Table 1, the CF serves to generally manage a PoC session among functions of the PoC server 150. The PoC server 150 receives requests for a floor (right to talk) from PoC clients, arranges an order in which to give the clients the floor, and gives the clients the floor in that order. The PoC server 150 also distributes a talk burst from a specific PoC client to all PoC clients participating in a group PoC call, and provides information of the PoC clients participating in the group PoC call.

As shown in Table 2 below, the PF manages a PoC session between the CF and each PoC client. In particular, the PF acts to relay the floor between the PoC client and the CF when the PoC client requests the floor or when the CF gives the floor to the PoC client. In addition, the PF serves to relay media between the CF and the PoC client, provide transcoding between different codecs, and provide a filtering function for filtering one of two PoC sessions chosen by a user when there is simultaneous talking in two simultaneous PoC sessions.

TABLE 2

| Participating PoC Function (PF) provides PoC session handling |
|---|
| May provide the Media relay function between PoC Client and Controlling PoC server |
| May provide user media adaptation procedures |
| May provide the Talk Burst control message relay function between PoC Client and Controlling PoC server |
| Provides SIP session handling, such as SIP session origination, termination, etc., on behalf of the represented PoC Client |
| Provides policy enforcement for incoming PoC session (e.g. access control, incoming PoC session barring, availability status, etc.) |
| May collect and provide media quality information |
| Provides the participant charging reports |
| May provide filtering of the media streams in the case of simultaneous sessions |
| May provide transcoding between different codecs |
| May support Talk Burst Control Protocol Negotiation |
| Stores the current Answer Mode and Incoming PoC Session Barring preferences of the PoC Client |

An aggregation proxy server 160 acts to collect requests of all entities using an XML Configuration Access Protocol (XCAP) in the PoC service system and transfer the requests to corresponding entities.

In order to use a PoC call service, the PoC user registers his/her PoC address in the SIP/IP core network 120. The SIP/IP core network 120 stores information regarding the PoC user at the request of the PoC user. Thus, when another PoC user tries to request a group PoC call, the PoC user registers his/her information in the SIP/IP core network 120 in advance as described above, and requests the group PoC call to his/her SIP/IP core network 120 by using group identification information transmitted from the PoC XDMS 140. The SIP/IP core network 120 performs address determination and domain location determination using information on the call requesting PoC user, and then transfers a PoC call request to a home PoC server with which the call requesting PoC user is registered. In regard to the PoC call request, the PoC server 150 prepares for establishment of a PoC session, obtains each user's information from the PoC XDMS 140, and then transfers a PoC call request signal to a corresponding SIP/IP core network 120. Here, in the case of a PoC call request to users within an Intradomain, the PoC server 150 performs both the CF and PF. The PoC server 150, which manages a call-requested PoC user, requests a PoC call to the PoC user after the SIP/IP core network 120 performs the location determination procedure, by using information on the PoC user that is transmitted to the PoC server 150. If the call-requested PoC user transmits an OK response to the call requesting PoC user, a PoC call is connected. When a PoC call is not connected due to a state of another PoC user regardless of a PoC call request of a PoC user, the PoC user can store his or her voice or media desired to transmit, using the PoC box 180.

FIG. 2 is a signaling diagram of a process of requesting and granting a media transmission right between a PoC client and a PoC server (CF) in a PoC network in which queuing is not supported.

Referring to FIG. 2, if the PoC client transmits a media transmission right request (Media Burst Control Protocol (MBCP) Request) message for requesting the media transmission right to the PoC server (CF) in step 200, the PoC server (CF) determines in step 202 whether a current state corresponds to a media transmission denial condition. The media transmission denial condition is any of five state conditions of the denial reasons described below. It is assumed that the current state does not correspond to a condition for granting the media transmission right to the PoC client.

If it is determined in step 202 that the current state corresponds to a media transmission denial condition, in step 204, the PoC server transmits a media transmission right request denial (MBCP Deny) message to the PoC client that has requested the media transmission right.

The PoC client, which has received the MBCP Deny message, informs a PoC user of a reason for denial contained in the MBCP Deny message.

The five reasons for denial defined in an OMA PoC specification are described below:

1. When another PoC user is transmitting media;
2. An internal error of a PoC server acting as a controlling PoC function;
3. When only a PoC client, which has requested a floor, in a relevant session;
4. When a penalty time (a retry after timer operation) is applied since the maximum media transmission time was not observed in previous media transmission; and
5. When a subscribing state of a PoC user is a listen only state.

That is, if the current state corresponds to one of the five denial reasons, the PoC server, which has received the MBCP Request message, transmits the MBCP Deny message to the PoC client without granting the media transmission right. The PoC server determines in step 206 whether the current state is free from the media transmission denial condition.

Thereafter, in order for the PoC client to obtain the media transmission right again, if a media transmission idle (MBCP Idle) message, which is a message having information that no PoC user exists in a PoC session, is received in step 208, the PoC client informs the PoC user of this state. If a request for the media transmission right is input by the PoC user, the PoC client can request a floor again by transmitting the MBCP Request message to the PoC server in step 210.

FIG. 3 is a message format of the MBCP Deny message transmitted from the PoC server.

Referring to FIG. 3, the first 2-bit field (300) is for a Real-time Transport Protocol (RTP) Version V. In the case of the present invention, the RTP version is 2. The second 1-bit field (301) is for a Padding bit P. It can be seen that if the padding bit P is given, one or two padding octets that are not contained in a payload, are added. The third 5-bit field (302) indicates a subtype. It can be seen by referring to an OMA PoC User Plane specification which function of a Time Burst Control Protocol (TBCP) a Real-time Transport Control Protocol Application (RTCP APP) packet performs using the subtype. For example, in the case of the MBCP Deny message, the subtype has a value defined as 00011.

The fourth 1-byte field (303) is for a Packet Type (PT), and is shown as PT=204, which indicates that this message is an RTCP APP packet. The fifth 2-byte field (304) is for a length field. If a value of 2 is used in the length field, this indicates that the message has two 4-byte octets. If the value is followed by a payload, this indicates a length of the payload, i.e. how many 4-byte octets exist in the payload. In the case of the MBCP Deny message, a total size of the MBCP Deny message is determined according to a reason phrase.

The sixth 4-byte field (305) is for a Synchronization SouRCe (SSRC) field. This field contains a synchronization source to discriminate senders of the RTCP APP message. The seventh 4-byte field (306) is expressed by an American Standard Code for Information Interchange (ASCII), which has a function of discriminating a PoC version according to the OMA PoC specification.

Reason code (307) related fields have a value indicating a denial reason. Four denial reasons defined in the OMA PoC specification are described below:

1. If the code value is 1, another PoC user has permission.
2. If the code value is 2, the media transmission right cannot be acquired due to an internal error of a PoC server.
3. If the code value is 3, a retry-after value has not been terminated yet. The retry-after value is a value of a timer activated by the PoC server when a PoC user transmitted media by spending his/her entire allowed time. That is, the timer is a penalty timer. Thus, the PoC user cannot acquire the media transmission right regardless of a media transmission right request while the timer is operating.
4. If the code value is 4, since the priority of the PoC user who has requested the media transmission right is set to 'Listen only', the PoC user cannot transmit but can receive media in a PoC session.

As described above, if a PoC user requests a media transmission right from a PoC server by means of a PoC client, and if the PoC user receives the MBCP Deny message in response, the PoC user can request the media transmission right again only after receiving an MBCP Idle message from the PoC server. That is, the PoC user must wait to receive the MBCP Idle message if the PoC user has received the MBCP Deny message.

SUMMARY OF THE INVENTION

An aspect of the present invention is to substantially solve at least the above problems and/or disadvantages and to provide at least the advantages below. Accordingly, an aspect of the present invention is to provide a media method and system for automatically requesting a media transmission right from a PTT over Cellular (PoC) server when the PoC server can grant the media transmission right to a PoC client regardless of the fact that the PoC client requested the media transmission right from the PoC server once and received a media transmission right request denial (Media Burst Control Protocol (MBCP) Deny) message.

According to one aspect of the present invention, there is provided a method of requesting and granting a media transmission right of a PoC user in a PoC system including a PoC client and a PoC server, the method including the PoC client transmitting a media transmission right request (MBCP Request) message to the PoC server according to a request of the PoC user; the PoC server receiving the MBCP Request message, determining whether a current state corresponds to a media transmission denial condition, and if it is determined that the current state corresponds to a media transmission denial condition, transmitting a media transmission right request denial (MBCP Deny) message containing at least one of time information of a media transmission timer and time information of a retry-after timer to the PoC client; and the PoC client receiving the MBCP Deny message, activating the media transmission timer and the retry-after timer using the respective time information if the time information of the media transmission timer and the time information of the retry-after timer are contained in the MBCP Deny message, and re-transmitting the MBCP Request message to the PoC server if one of the media transmission timer and the retry-after timer, which has a longer time value, expires.

According to another aspect of the present invention, there is provided a system for requesting and granting a media transmission right of a PoC user, the system including a PoC client for transmitting a media transmission right request (MBCP Request) message according to a request of the PoC user, and if a media transmission right request denial (MBCP Deny) message is received, determining whether time information of a media transmission timer and time information of a retry-after timer are contained in the MBCP Deny message, and if the time information of the media transmission timer and the time information of the retry-after timer are contained in the MBCP Deny message, activating the media transmission timer and the retry-after timer using the respective time information, and if one of the media transmission timer and the retry-after timer, which has a longer time value, expires, re-transmitting the MBCP Request message; and a PoC server for, if the MBCP Request message is received, determining whether a current state corresponds to a media transmission denial condition, and if it is determined that the current state corresponds to a media transmission denial condition, transmitting the MBCP Deny message containing at least one of the media transmission timer time information and the retry-after timer time information to the PoC client.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. Hereinafter, there is described a case of applying the present invention to a Push To Talk (PTT) system, in particular, a PTT over Cellular (PoC) system providing a PTT service using a cellular mobile communication network. In general, the PoC system uses a Session Initiation Protocol (SIP) and a SIP extension protocol in order to transfer session participation information of a group PoC call, and an extensible markup language Configuration Access Protocol (XCAP) in order to obtain group information. The functionality of the present invention described below can be implemented using the above-described protocols, and the basic construction of the present invention can be based on a PoC Rel.1 system.

Figure 4:
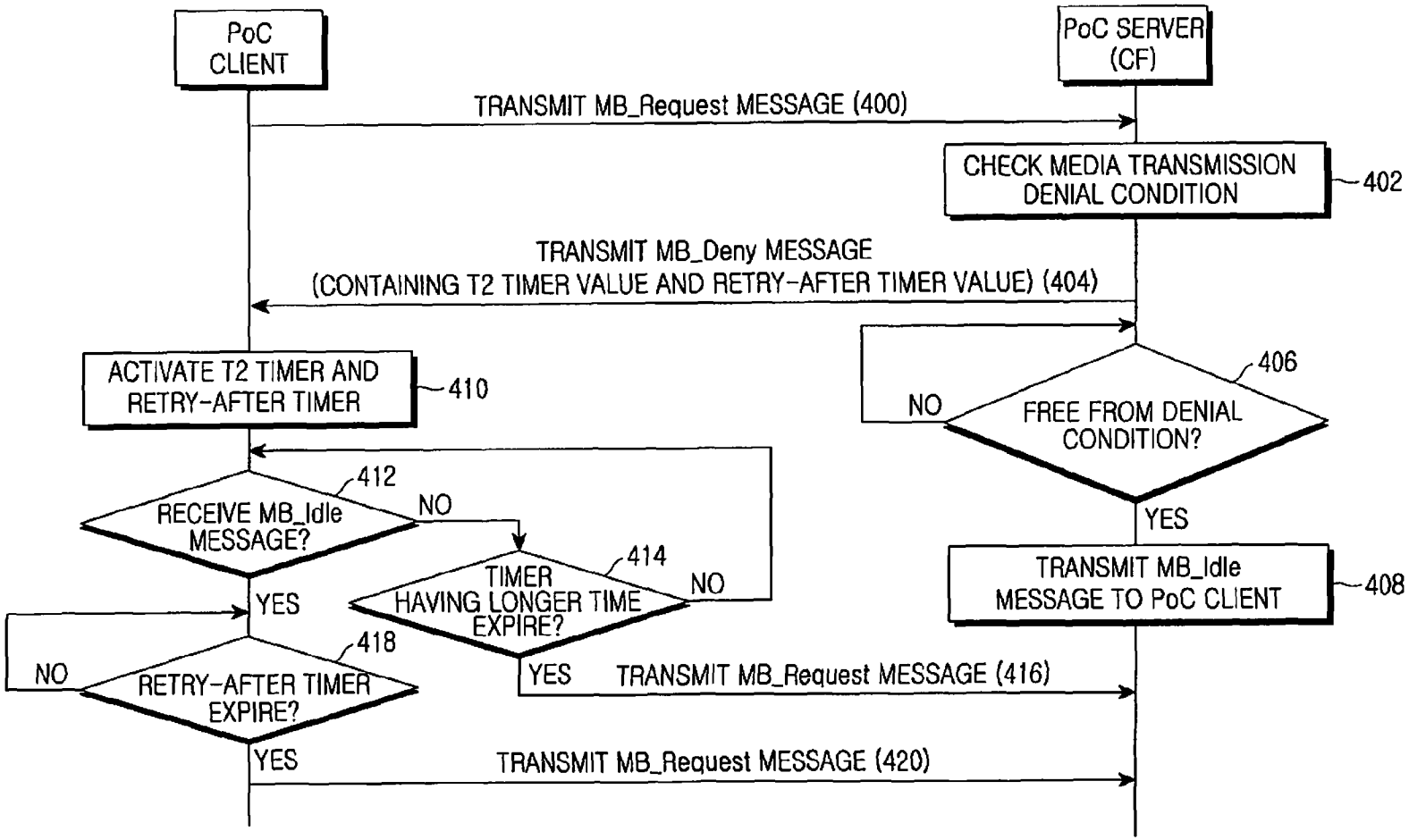
FIG. 4 is a signaling diagram of a process of requesting and granting a media transmission right of a PoC user according to an exemplary embodiment of the present invention.
Figure 5:
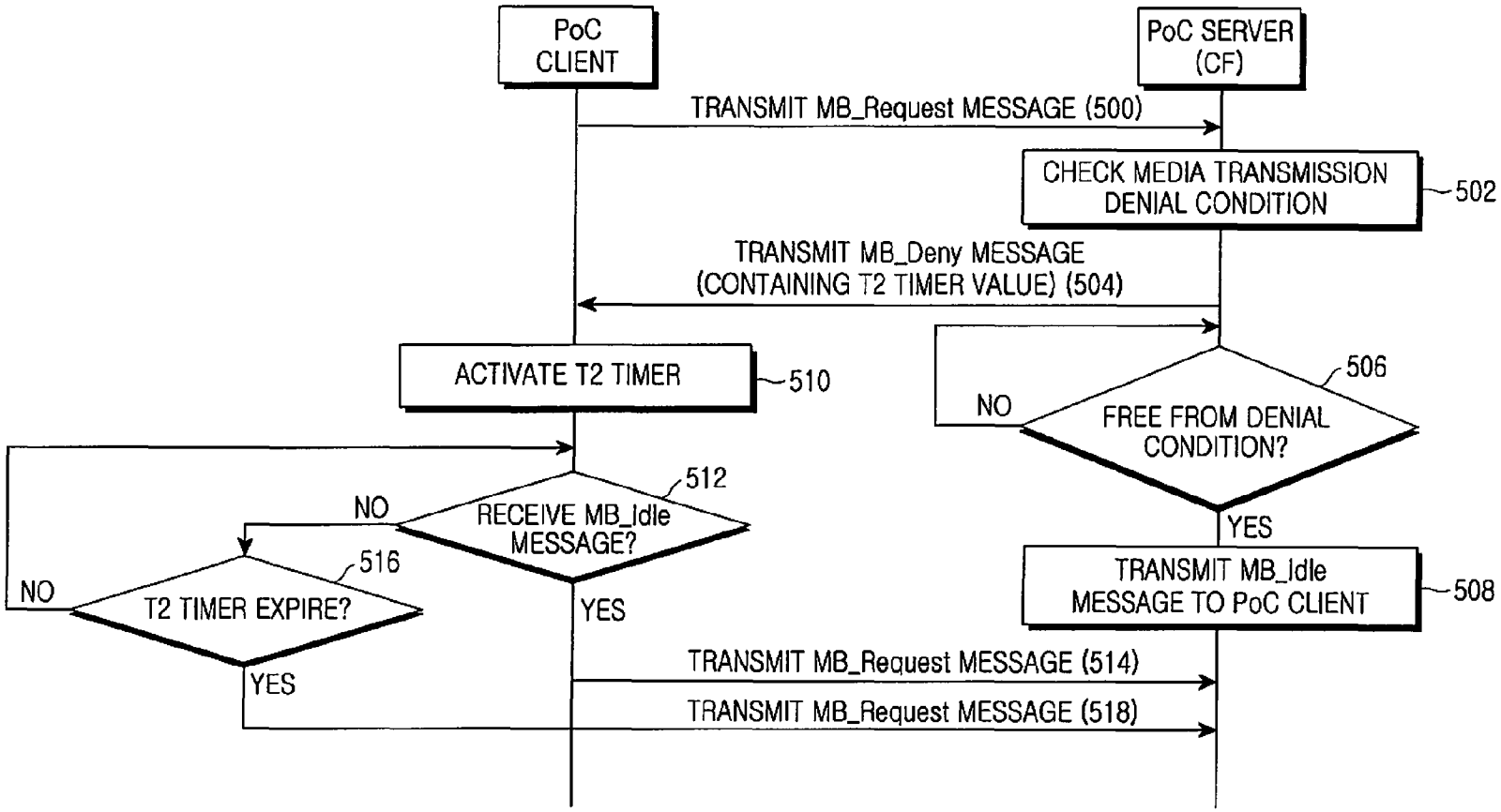
FIG. 5 is a signaling diagram of a process of requesting and granting a media transmission right of a PoC user according to another exemplary embodiment of the present invention.
Figure 6:
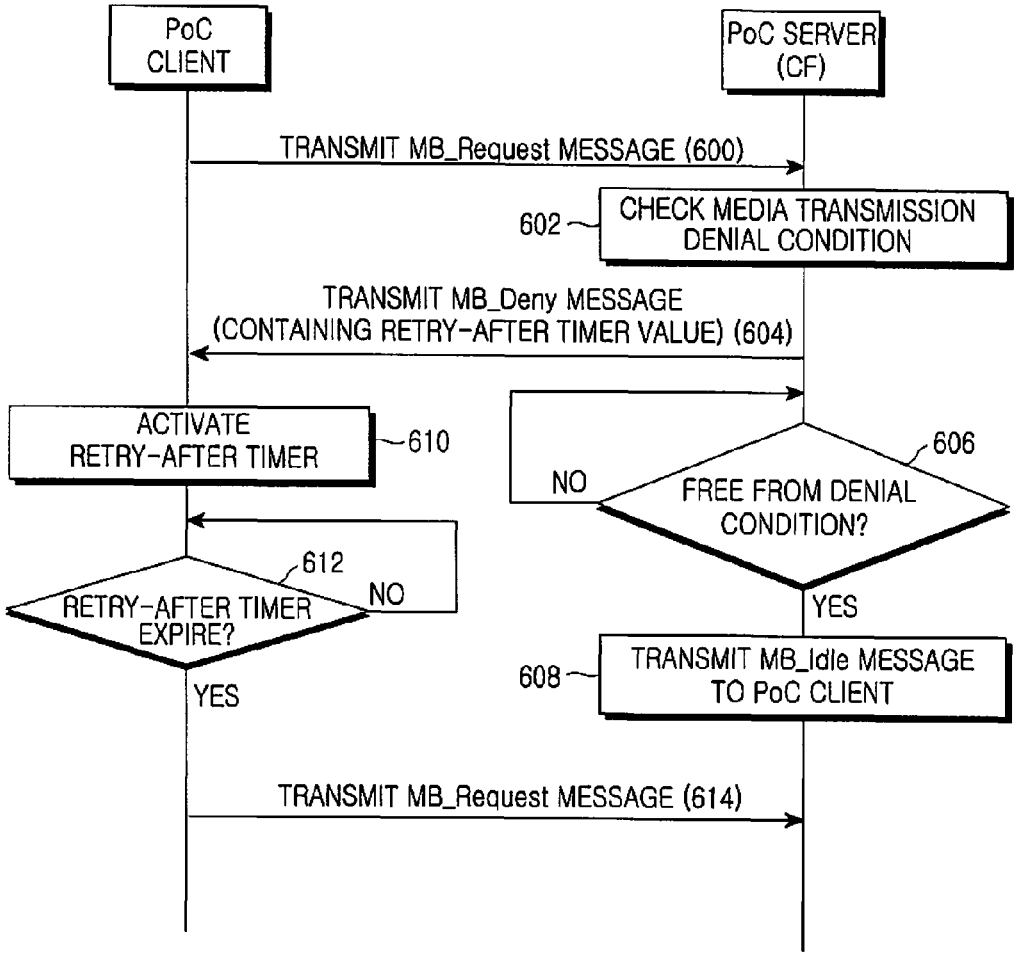
FIG. 6 is a signaling diagram of a process of requesting and granting a media transmission right of a PoC user according to another exemplary embodiment of the present invention.

An optimized method used by a PoC user to request a media transmission right from a PoC server and acquiring the media transmission right from the PoC server in a PoC network in which queuing is not supported will now be described with reference to FIGS. 4 through 6. FIG. 4 is a signaling diagram of a process of transmitting a media transmission right request denial (MBCP Deny) message containing a stop talking (T2) timer value and a retry-after timer value according to an exemplary embodiment of the present invention, FIG. 5 is a signaling diagram of a process of transmitting an MBCP Deny message containing a T2 timer value according to another exemplary embodiment of the present invention, and FIG. 6 is a signaling diagram of a process of transmitting an MBCP Deny message containing a retry-after timer value according to another exemplary embodiment of the present invention.

Referring to FIG. 4, if a PoC client transmits a media transmission right request (MBCP Request) message to a PoC server which does not support queuing in step 400 in order to request a media transmission right, the PoC server determines in step 402 whether a current state corresponds to one of the media transmission denial conditions described above when the MBCP Request message is received.

In the current embodiment, the PoC server determines whether a current state corresponds to one of the media transmission denial conditions by determining whether media of another PoC user is being transmitted or whether a retry-after timer is activated. If the current state corresponds to one of the two determined conditions, the PoC server transmits an MBCP Deny message to the PoC client. According to the present invention, a stop talking (T2) timer value according to whether media of another PoC user is being transmitted and/or a retry-after timer value according to whether the retry-after timer is activated are contained in the MBCP Deny message and transmitted. As a result of the determination of whether the current state corresponds to one of the media transmission denial conditions, the T2 timer value is contained in the MBCP Deny message if a T2 timer is activated since media of another PoC user is being transmitted, the retry-after timer value is contained in the MBCP Deny message if media of another PoC user is not being transmitted but the retry-after timer is activated for the PoC client, or the T2 timer value and the retry-after timer value are contained in the MBCP Deny message if the current state corresponds to both the two determination conditions, i.e. if media of another PoC user is being transmitted and the retry-after timer is activated for the PoC client.

The T2 timer is a media transmission time timer, and the retry-after timer is a penalty timer for the PoC client. In more detail, the T2 timer value is an initial value when the PoC server begins to transmit media transmitted by the PoC client to a target PoC client or group, and decreases on a second basis while the media is being transmitted. For example, if the initial value of the T2 timer is 30 and 14 seconds has elapsed, the T2 timer value is 16. The T2 timer value of 16 means that the PoC server is going to transmit media of a relevant PoC user for 16 seconds more. The retry-after timer value decreases on a second-by-second basis from an initial value to 0. The retry-after timer is used to deny a media transmission right regardless of a request for the media transmission right of the PoC user until the retry-after timer value becomes 0. For example, if the retry-after timer value is 20, the PoC user cannot acquire the media transmission right for 20 seconds, regardless of a request for the media transmission right.

Since the MBCP Deny message in the exemplary embodiment of FIG. 4 contains both a T2 timer value and a retry-after timer value, the PoC server transmits the MBCP Deny message containing MBCP Request message acceptable time information to the PoC client in step 404. The MBCP Request message acceptable time information indicates the T2 timer value and the retry-after timer value, which are media transmission time information. In the exemplary embodiment of FIG. 4, the MBCP Deny message containing the two pieces of time information is transmitted. After transmitting the MBCP Deny message, the PoC server determines in step 406 whether the current state is free from the media transmission denial condition. That is, it is determined whether a media transmission release (MBCP Release) message is received from another PoC client message or whether the T2 timer or the retry-after timer expires. If any one is satisfied, the PoC server transmits a media transmission idle (MBCP Idle) message to the PoC client in step 408.

The PoC client, which has received the MBCP Deny message in step 404, activates the T2 timer with the T2 timer value and simultaneously activates the retry-after timer with the retry-after timer value in step 410. That is, if the PoC server transmits the MBCP Deny message containing time information of the T2 timer and time information of the retry-after timer, the PoC client informs the PoC user what is a current denial reason and that the media transmission right is going to be requested after the T2 timer value or the retry-after timer value. When the two pieces of time information are simultaneously received, the two pieces of time information are compared to each other, and the media transmission right is requested after one of the T2 timer and the retry-after timer, which has a longer time value, expires.

The PoC client determines in step 412 whether the MBCP Idle message has been received. If it is determined in step 412 that the MBCP Idle message has been received, the PoC client determines in step 418 whether the retry-after timer has expired. If it is determined in step 418 that the retry-after timer has expired, the PoC client automatically transmits the MBCP Request message to the PoC server in step 420.

In this case, the PoC client may automatically transmit the MBCP Request message when a retry condition is satisfied, i.e. when the retry-after timer expires, as described above, or may inform the PoC user that the MBCP Request message can be transmitted, and transmit the MBCP Request message to the PoC server according to the PoC user's selection. In addition, when the MBCP Request message is automatically transmitted, a message for informing the PoC user that the MBCP Request message has been automatically transmitted may be displayed on a screen.

If it is determined in step 412 that the MBCP Idle message has not been received, the PoC client determines in step 414 whether one of the T2 timer and the retry-after timer, the retry-after timer having a longer time value, has expired. If it is determined in step 414 that the timer having a longer time value has expired, the PoC client transmits the MBCP Request message to the PoC server in step 416. Otherwise, the process continues to step 412. That is, the PoC client activates the retry-after timer based on the time information contained in the MBCP Deny message, calculates the time a media transmission time ends, and requests the media transmission right without a request of the PoC user at the calculated time. For example, when the MBCP Deny message containing the two pieces of time information is received, a timer is activated based on time information having a longer time value among the two pieces of time information as described above, and when the timer expires, the media transmission right is requested.

Figure 8:
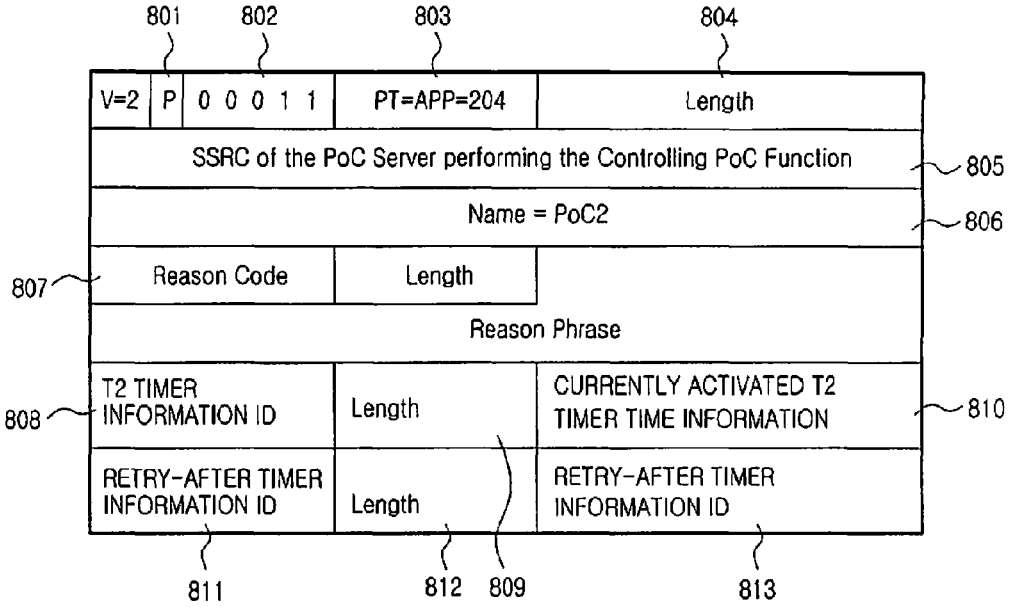
FIG. 8 is a message format of an MBCP Deny message according to an exemplary embodiment of the present invention.

FIG. 8 is a message format of an MBCP Deny message containing T2 timer time information and retry-after time information, which is transmitted from a PoC server to a PoC client according to an exemplary embodiment of the present invention.

Referring to FIG. 8, the first 2-bit field is for a Real-time Transport Protocol (RTP) version. In the case of the present invention, the RTP version is 2. The second 1-bit field (801) is for a padding bit P. It can be seen that if the padding bit P is given, one or two padding octets that are not contained in a payload, are added. The third 5-bit field (802) indicates a subtype. It can be seen by referring to the OMA PoC User Plane specification which function of a Time Burst Control Protocol (TBCP) a Real-time Transport Control Protocol Application (RTCP APP) packet performs using the subtype. For example, in the specification that is currently drafted in the OMA, the subtype has a value defined as 00011 for an MBCP Deny message. The fourth 1-byte field (803) is for a Packet Type (PT), and is shown as PT=204, which indicates that this message is an RTCP APP packet. The fifth 2-byte field (804) is for a length field. If a value of 2 is used in the length field, this indicates that the message has two 4-byte octets. If the value is followed by a payload, this indicates a length of the payload, i.e. how many 4-byte octets exist in the payload. In the case of the MBCP Deny message, a total length of the MBCP Deny message is determined according to a reason phrase. The sixth 4-byte field (805) is for a Synchronization SouRCe (SSRC) field. This field contains a synchronization source to discriminate who sent the RTCP APP message. The seventh 4-byte field (806) is expressed by American Standard Code for Information Interchange (ASCII), which has the function of discriminating a PoC version according to the OMA PoC specification. Reason code (807) related fields have a value indicating a denial reason.

Figure 1:
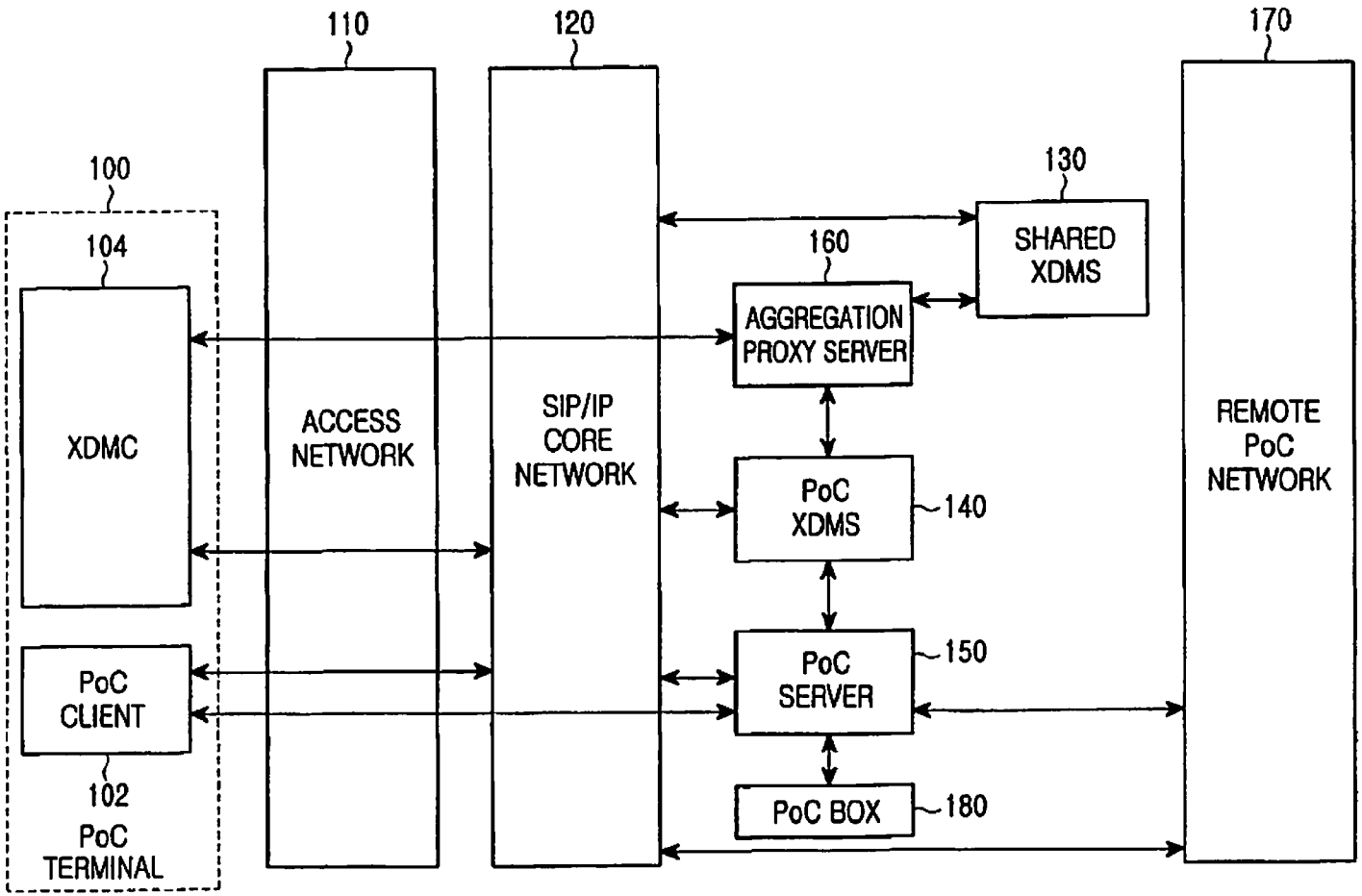
FIG. 1 is a schematic diagram of a conventional PoC system.
Figure 2:
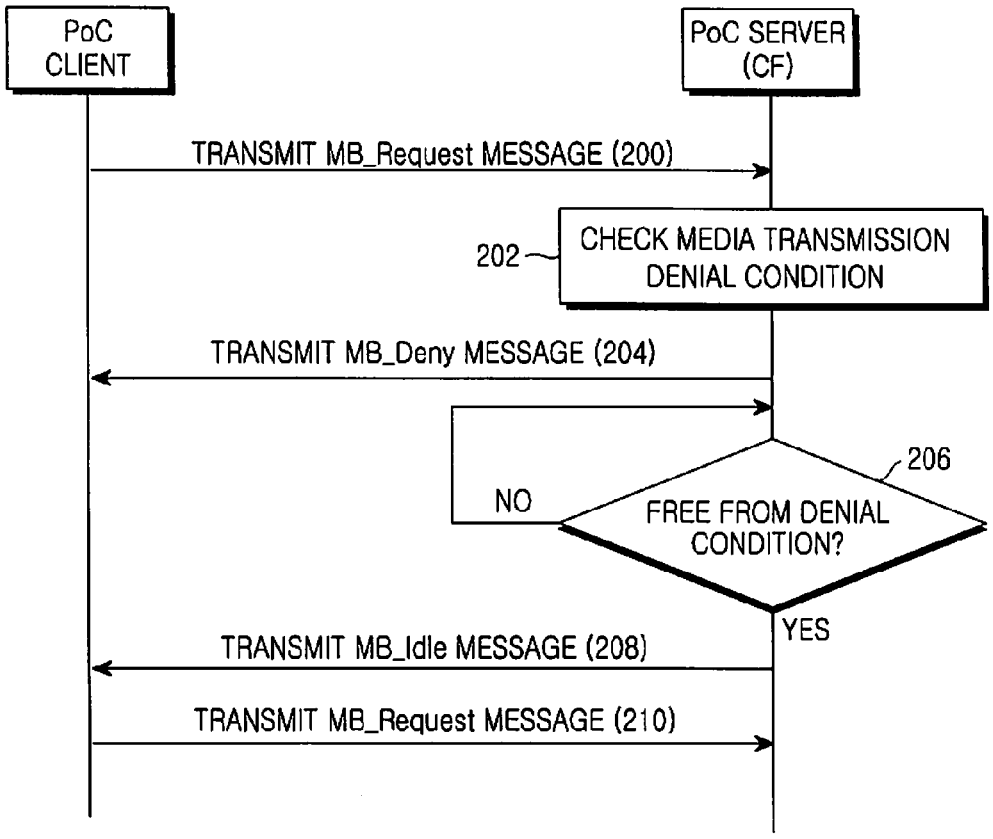
FIG. 2 is a signaling diagram of a conventional process of requesting and granting a media transmission right of a PoC user.
Figure 3:
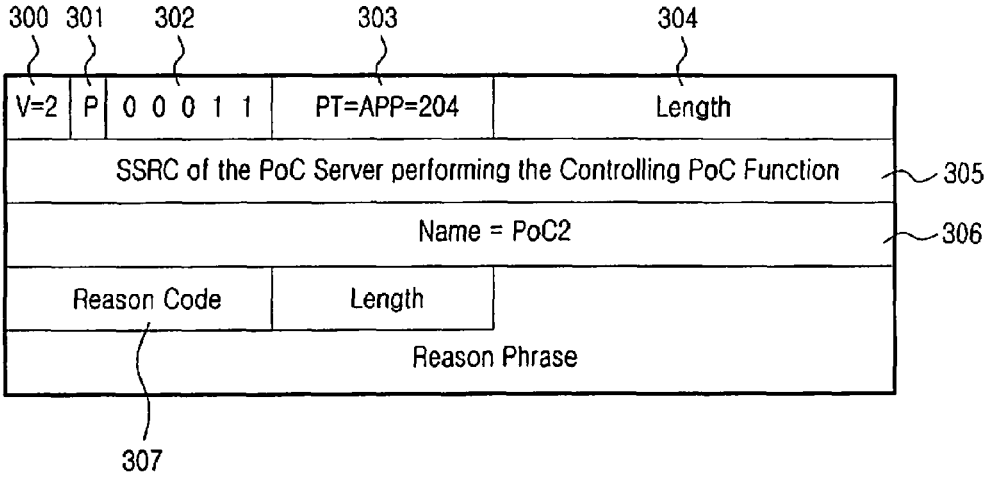
FIG. 3 is a message format of a conventional media transmission right request denial (MBCP Deny) message.

That is, the fields before a T2 timer information ID field (808) are the same as those of the conventional MBCP Deny message illustrated in FIG. 3. That is, the MBCP Deny message according to an exemplary embodiment of the present invention further includes the T2 timer information ID field (808), a length field (809), a currently activated T2 timer time information value field (810), a retry-after timer information ID field (811), a length field (812), and a retry-after timer time information value field (813).

The T2 timer information ID field and the retry-after timer information ID field are used to identify that the MBCP Deny message contains T2 timer information or retry-after timer time information. Each length field indicates the length of the T2 timer or retry-after timer value, which follows the length field. The T2 timer time information value field and the retry-after timer time information value field respectively have a value of the T2 timer activated by the PoC server, which is a media transmission time value of another PoC user, and a value of the retry-after timer currently activated by the PoC server for the PoC client.

A process of transmitting an MBCP Deny message containing a T2 timer value in a PoC server according to another exemplary embodiment of the present invention will now be described with reference to FIG. 5.

Steps 500, 502, 506, and 508 of FIG. 5 are respectively to the same as steps 400, 402, 406, and 408 of FIG. 4.

Referring to FIG. 5, the PoC server determines in step 502 whether a current state corresponds to one of the media transmission denial conditions described above when an MBCP Request message is received. If it is determined in step 502 that the T2 timer is activated since media of another PoC user is being transmitted, the PoC server transmits an MBCP Deny message containing a T2 timer value to a PoC client in step 504.

The PoC client, which has received the MBCP Deny message, activates a T2 timer using the T2 timer value contained in the MBCP Deny message in step 510. The PoC client determines in step 512 whether an MBCP Idle message has been received. If it is determined in step 512 that the MBCP Idle message has been received, the PoC client transmits the MBCP Request message to the PoC server in step 514.

If it is determined in step 512 that the MBCP Idle message has not been received, the PoC client determines in step 516 whether the T2 timer has expired. If it is determined in step 516 that the T2 timer has expired, the PoC client transmits the MBCP Request message to the PoC server in step 518. Otherwise, the process continues to step 512. For example, it is assumed that a specific PoC client has transmitted an MBCP Request message to the PoC server and received an MBCP Deny message containing a T2 timer value of 20. That is, this means that another PoC client is being transmitted media and that the remaining transmission time is 20 seconds. Thus, the specific PoC client activates a T2 timer having an initial value of 20 and re-transmits the MBCP Request message to the PoC server without a re-request of a PoC user when the T2 timer expires. If an MBCP Idle message is received from the PoC server before the T2 timer expires, since this means that no PoC client transmits media, the specific PoC client immediately transmits the MBCP Request message to the PoC server even before the 20 seconds elapse.

In steps 514 and 518, when the PoC client transmits the MBCP Request message to the PoC server, a message for informing the PoC user that the MBCP Request message has been automatically transmitted may be displayed on a screen. In addition, the PoC client may not automatically transmit the MBCP Request message, but may inform the PoC user that the MBCP Request message can be transmitted and transmit the MBCP Request message to the PoC server according to the PoC user's selection.

A process of transmitting an MBCP Deny message containing a retry-after timer value in a PoC server according to another exemplary embodiment of the present invention will now be described with reference to FIG. 6.

Steps 600, 602, 606, and 608 of FIG. 6 are respectively the same as equal to steps 400,402, 406, and 408 of FIG. 4.

Referring to FIG. 6, the PoC server determines in step 602 whether a current state corresponds to one of the media transmission denial conditions described above when an MBCP Request message is received. If it is determined in step 602 that media of another PoC user is not being transmitted but a retry-after timer is activated for a PoC client, the PoC server transmits an MBCP Deny message containing a retry-after timer value to the PoC client in step 604.

The PoC client, which has received the MBCP Deny message activates a retry-after timer using the retry-after timer value contained in the MBCP Deny message in step 610. The PoC client determines in step 612 whether the retry-after timer has expired. If it is determined in step 612 that the retry-after timer has expired, the PoC client transmits the MBCP Request message to the PoC server in step 614. Unlike the embodiment of FIG. 5, in FIG. 6, whether an MBCP Idle message is received is not determined because even if the PoC client has received the MBCP Idle message, if a retry-after timer for the PoC client is activated in the PoC server, the PoC server does not grant the media transmission right to the PoC client regardless of a request for the media transmission right of the PoC client until the retry-after timer for the PoC client expires.

Figure 7:
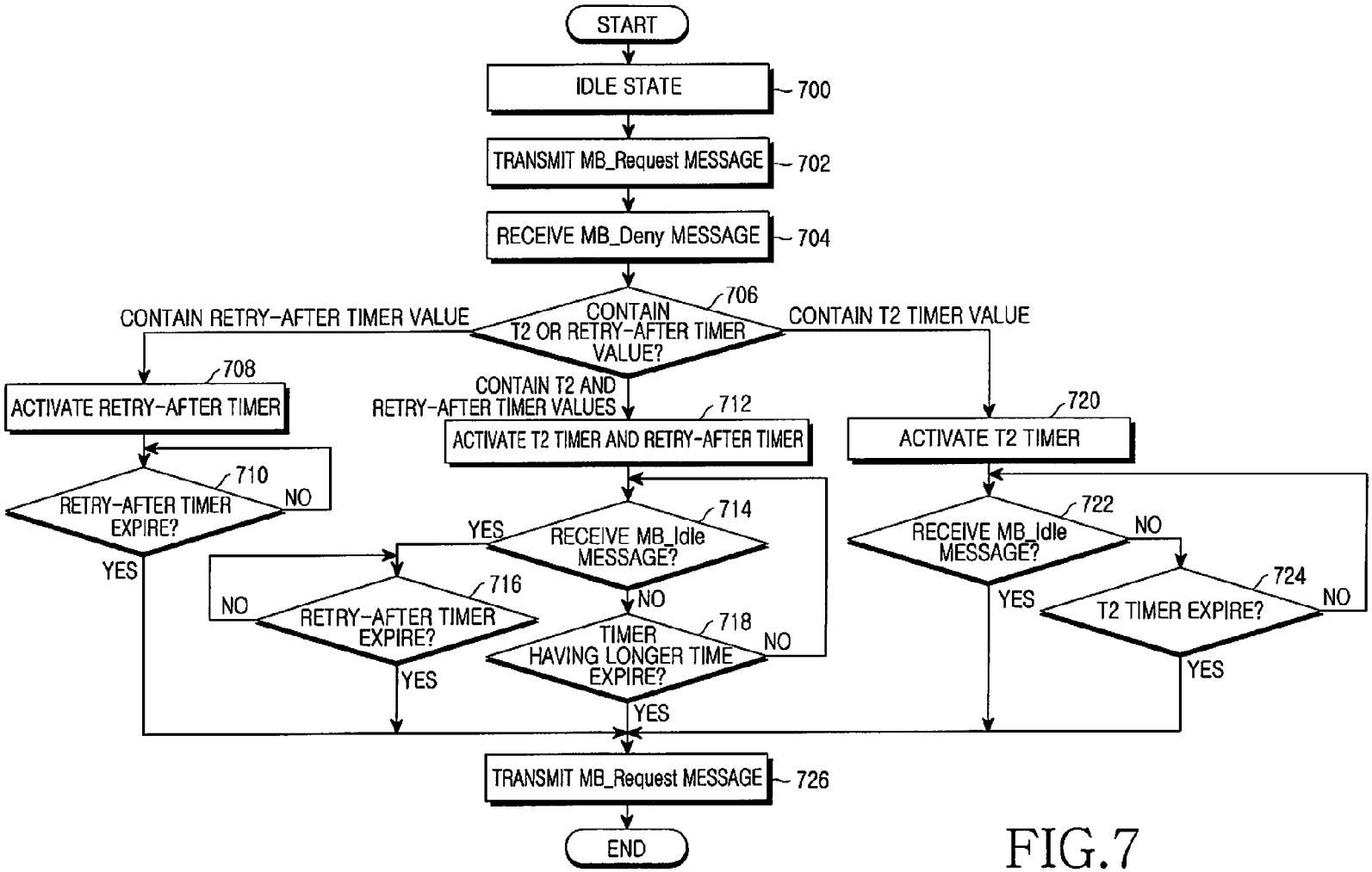
FIG. 7 is a flowchart of a process performed by a PoC client to re-transmit a media transmission right request (MBCP Request) message after receiving an MBCP Deny message according to an exemplary embodiment of the present invention.

FIG. 7 is a flowchart of a process performed by a PoC client to re-transmit a media transmission right request (MBCP Request) message after receiving an MBCP Deny message according to an exemplary embodiment of the present invention.

In an idle state of step 700, if a media transmission request is input by a PoC user, the PoC client transmits an MBCP Request message to a PoC server in step 702. If an MBCP Deny message is received from a PoC server in step 704, the PoC client determines in step 706 whether the MBCP Deny message contains a T2 timer value or a retry-after timer value. If it is determined in step 706 that the MBCP Deny message contains neither the T2 timer value nor the retry-after timer value, according to a conventional media retransmission request method, the PoC user directly controls the PoC client to re-transmit the MBCP Request message to the PoC server after an MBCP Idle message is received. The conventional media retransmission request method is omitted in FIG. 7.

If it is determined in step 706 that the MBCP Deny message contains both the T2 timer value and the retry-after timer value, i.e. two timer values, the process continues to step 712. If it is determined in step 706 that the MBCP Deny message contains the T2 timer value, the process continues to step 720. If it is determined in step 706 that the MBCP Deny message contains the retry-after timer value, the process continues to step 708.

If it is determined in step 706 that the MBCP Deny message contains both the T2 timer value and the retry-after timer value, i.e. the two timer values, the PoC client activates a T2 timer and a retry-after timer using the two timer values in step 712. The PoC client determines in step 714 whether an MBCP Idle message has been received. If it is determined in step 714 that the MBCP Idle message has been received, the PoC client determines in step 716 whether the retry-after timer has expired. If it is determined in step 716 that the retry-after timer has expired, the PoC client transmits the MBCP Request message to the PoC server in step 726. If it is determined in step 714 that the MBCP Idle message has not been received, the PoC client determines in step 718 whether one of the T2 timer and the retry-after timer, the retry-after timer having a longer time value, has expired. If it is determined in step 718 that the timer having a longer time value has expired, the PoC client transmits the MBCP Request message to the PoC server in step 726.

If it is determined in step 706 that the MBCP Deny message contains only the T2 timer value, the PoC client activates a T2 timer in step 720, and determines in step 722 whether an MBCP Idle message has been received. If it is determined in step 722 that the MBCP Idle message has been received, the PoC client transmits the MBCP Request message to the PoC server in step 726. If it is determined in step 722 that the MBCP Idle message has not been received, the PoC client determines in step 724 whether the T2 timer has expired. If it is determined in step 724 that the T2 timer has expired, the PoC client transmits the MBCP Request message to the PoC server in step 726.

If it is determined in step 706 that the MBCP Deny message contains only the retry-after timer value, the PoC client activates a retry-after timer using the retry-after timer value in step 708. The PoC client determines in step 710 whether the retry-after timer has expired. If it is determined in step 710 that the retry-after timer has expired, the PoC client transmits the MBCP Request message to the PoC server in step 726.

The MBCP Request message of step 726 may be re-transmitted by storing the MBCP Request message of step 702 in a memory of the PoC client and reading the stored MBCP Request message. In addition, when the PoC client re-transmits the MBCP Request message to the PoC server in step 726, a message for informing the PoC user that the MBCP Request message has been automatically retransmitted may be displayed on a screen. In addition, the PoC client may not automatically transmit the MBCP Request message, but may inform the PoC user that the MBCP Request message can be transmitted and transmit the MBCP Request message to the PoC server according to the PoC user's selection.

As described above, according to the present invention, even if a request for a media transmission right is denied, a PoC client can store an MBCP Request message and transmit the stored MBCP Request message without a PoC user's re-request when a timer expires or when an MBCP Idle message is received, and thus, a media transmission right request time can be reduced, and the efficiency of an overall PoC network operation can be increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

[1. A method of requesting and granting a media transmission right of a PTT over Cellular (PoC) user in a PoC system, which includes a PoC client and a PoC server, the method comprising:

the PoC client transmitting a media transmission right request (Media Burst Control Protocol (MBCP) Request) message to the PoC server according to a request of the PoC user;

the PoC server receiving the MBCP Request message, determining whether a current state corresponds to a media transmission denial condition, and if it is determined that the current state corresponds to a media transmission denial condition, transmitting a media transmission right request denial (MBCP Deny) message containing at least one of time information of a media transmission timer and time information of a retry-after timer to the PoC client; and the PoC client receiving the MBCP Deny message, if the time information of the media transmission timer and the time information of the retry-after timer are contained in the MBCP Deny message, activating the media transmission timer and the retry-after timer using respective time information, and re-transmitting the MBCP Request message to the PoC server if one of the media transmission timer and the retry-after timer, the retry-after timer having a longer time value, expires.]

[2. The method of claim 1, further comprising the PoC client storing the MBCP Request message after transmitting the MBCP Request message according to the request of the PoC user.]

[3. The method of claim 2, further comprising, if a media transmission idle (MBCP Idle) message is received while activating the media transmission timer and the retry-after timer, the PoC client determining whether the retry-after timer has expired, and if it is determined that the retry-after timer has expired, re-transmitting the MBCP Request message.]

[4. The method of claim 2, further comprising:

if the time information of the media transmission timer is contained in the MBCP Deny message received by the PoC client, the PoC client activating the media transmission timer using the time information of the media transmission timer;

determining whether an MBCP Idle message is received while activating the media transmission timer, and if it is determined that the MBCP Idle message is received, re-transmitting the MBCP Request message; and if the media transmission timer expires, re-transmitting the MBCP Request message.]

[5. The method of claim 2, further comprising:

if the time information of the retry-after timer is contained in the MBCP Deny message received by the PoC client, activating the retry-after timer using the time information of the retry-after timer; and if the retry-after timer expires, re-transmitting the MBCP Request message.]

[6. The method of claim 2, wherein when the PoC client re-transmits the MBCP Request message, the PoC client re-transmits a stored MBCP Request message.]

[7. The method of claim 6, further comprising the PoC client re-transmitting the MBCP Request message and simultaneously informing the PoC user that the MBCP Request message is re-transmitted.]

[8. A system for requesting and granting a media transmission right of a PTT over Cellular (PoC) user, the system comprising:

a PoC client for transmitting a media transmission right request (MBCP Request) message according to a request of the PoC user, and if a media transmission right request denial (MBCP Deny) message is received, determining whether time information of a media transmission timer and time information of a retry-after timer are contained in the MBCP Deny message, and if the time information of the media transmission timer and the time information of the retry-after timer are contained in the MBCP Deny message, activating the media transmission timer and the retry-after timer using respective time information, and if one of the media transmission timer and the retry-after timer, which has a longer time value, expires, re-transmitting the MBCP Request message; and a PoC server for, if the MBCP Request message is received, determining whether a current state corresponds to a media transmission denial condition, and if it is determined that the current state corresponds to a media transmission denial condition, transmitting the MBCP Deny message containing at least one of the media transmission timer time information and the retry-after timer time information to the PoC client.]

[9. The system of claim 8, wherein the PoC client stores the MBCP Request message after transmitting the MBCP Request message according to the request of the PoC user.]

[10. The system of claim 9, wherein if a media transmission idle (MBCP Idle) message is received while activating the media transmission timer and the retry-after timer, the PoC client determines whether the retry-after timer has expired, and if it is determined that the retry-after timer has expired, re-transmits the MBCP Request message.]

[11. The system of claim 9, wherein if the time information of the media transmission timer is contained in the MBCP Deny message received by the PoC client, the PoC client activates the media transmission timer using the time information of the media transmission timer, determines whether an MBCP Idle message is received while activating the media transmission timer, and if it is determined that the MBCP Idle message is received, re-transmits the MBCP Request message.]

[12. The system of claim 11, wherein if the media transmission timer expires, the PoC client re-transmits the MBCP Request message.]

[13. The system of claim 9, wherein if the time information of the retry-after timer is contained in the MBCP Deny message received by the PoC client, the PoC client activates the retry-after timer using the time information of the retry-after timer, and if the retry-after timer expires, re-transmits the MBCP Request message.]

[14. The system of claim 9, wherein when the PoC client re-transmits the MBCP Request message, the PoC client re-transmits the stored MBCP Request message.]

[15. The system of claim 14, wherein the PoC client re-transmits the MBCP Request message and simultaneously informs the PoC user that the MBCP Request message is re-transmitted.]

*16. A method of granting a media transmission right of a user by a server, the method comprising:*

*receiving a media transmission right request message from a client;*

*determining whether a current state corresponds to a media transmission denial condition;*

*if it is determined that the current state corresponds to the media transmission denial condition, transmitting, to the client, a media transmission right request denial message including time information of a media transmission timer and time information of a retry-after timer for re-transmitting the media transmission right request message; and*

*receiving a re-transmission of the media transmission right request from the client, when one of the media transmission timer and the retry-after timer having a longer duration expires.*

*17. The method of claim 16, wherein determining whether the current state corresponds to the media transmission denial condition comprises determining whether media of another user is being transmitted or whether the retry-after timer is activated.*

*18. The method of claim 16, further comprising:*

*determining whether the current state still corresponds to the media transmission denial condition, after transmitting the media transmission right request denial message; and*

*transmitting a media transmission idle message to the client, when the current state no longer corresponds to the media transmission denial condition.*

*19. A method of requesting a media transmission right of a user by a client, the method comprising:*

*transmitting a media transmission right request message to a server;*

*receiving a media transmission right request denial message including time information of a media transmission timer and time information of a retry-after timer for retransmitting the media transmission right request message;*

*activating the media transmission timer and the retry-after timer; and*

*re-transmitting the media transmission right request to the server, if one of the media transmission timer and the retry-after timer having a longer duration expires.*

*20. The method of claim 19, further comprising:*

*receiving a media transmission idle message from the server when the media transmission timer and the retry-after timer are activated; and*

*re-transmitting the media transmission right request message to the server, when the retry-after timer expires.*

*21. The method of claim 20, further comprising:*

*re-transmitting the media transmission right request message to the server, if the media transmission timer expires.*

*22. The method of claim 19, further comprising storing the media transmission right request message.*

*23. A server for granting a media transmission right of a user, the server comprising:*

*a hardware processor for receiving a media transmission right request message from a client, determining whether a current state corresponds to a media transmission denial condition, if it is determined that the current state corresponds to the media transmission denial condition, transmitting, to the client, a media transmission right request denial message including time information of a media transmission timer and time information of a retry-after timer for re-transmitting of the media transmission right request message, and receiving a re-transmission of the media transmission right request from the client, when one of the media transmission timer and the retry-after timer having a longer duration expires.*

*24. The server of claim 23, wherein the hardware processor determines whether the current state corresponds to the media transmission denial condition based on whether media of another user is being transmitted or whether the retry-after timer is activated.*

*25. The server of claim 23, wherein the hardware processor determines whether the current state still corresponds to the media transmission denial condition, after transmitting the media transmission right request denial message, and transmits a media transmission idle message to the client, when the current state no longer corresponds to the media transmission denial condition.*

*26. A terminal for requesting a media transmission right of a user, the terminal comprising:*

*a client for transmitting a media transmission right request message to a server, receiving a media transmission right request denial message including time information of a media transmission timer and time information of a retry-after timer for re-transmitting the media transmission right request message, activating the media transmission timer and the retry-after timer, and re-transmitting the media transmission right request to the server, if one of the media transmission timer and the retry-after timer having a longer duration expires.*

*27. The terminal of claim 26, wherein the client determines if a media transmission idle message is received from the server, and re-transmits the media transmission right request message to the server when the retry-after timer expires, if the media transmission idle message is received.*

*28. The terminal of claim 26, wherein the client determines if a media transmission idle message is received from the server, and re-transmits the media transmission right request message to the server, if the media transmission idle message is received.*

*29. The terminal of claim 26, wherein the client stores the media transmission right request message.*

* * * * *